United States Patent [19]
Kamamori et al.

[11] Patent Number: 5,610,740
[45] Date of Patent: Mar. 11, 1997

[54] COLOR ELECTROOPTICAL DEVICE

[75] Inventors: Hitoshi Kamamori; Takakazu Fukuchi; Mitsuru Suginoya; Koji Iwasa, all of Tokyo, Japan

[73] Assignee: Seiko Instruments Inc., Japan

[21] Appl. No.: 869,525

[22] Filed: Apr. 15, 1992

[30]  Foreign Application Priority Data

Apr. 16, 1991  [JP]  Japan .................................... 3-084284

[51] Int. Cl.$^6$ ........................ G02F 1/1335; G02F 1/1333
[52] U.S. Cl. .......................................... 349/110; 349/122
[58] Field of Search ................................ 359/62, 66, 67, 359/68, 74, 79, 87

[56]  References Cited

U.S. PATENT DOCUMENTS

| | | | |
|---|---|---|---|
| 4,522,691 | 6/1985 | Suginoya et al. | 204/18.1 |
| 4,560,241 | 12/1985 | Stolov et al. | 359/68 |
| 4,601,546 | 7/1986 | Ohta | 359/68 |
| 4,617,094 | 10/1986 | Suginoya et al. | 204/18.1 |
| 4,653,862 | 3/1987 | Morozumi | 359/68 |
| 4,779,957 | 10/1988 | Suginoya et al. | 359/68 |
| 4,781,444 | 11/1988 | Suginoya et al. | 359/63 |
| 4,853,296 | 8/1989 | Fukuyoshi | 428/623 |
| 4,859,036 | 8/1989 | Yamanaka et al. | 359/87 |
| 4,881,797 | 11/1989 | Aoki et al. | 359/67 |
| 5,128,786 | 7/1992 | Yanagisawa | 359/68 |
| 5,132,830 | 7/1992 | Fukutani et al. | 359/67 |
| 5,151,379 | 9/1992 | Suginoya et al. | 427/39 |
| 5,161,043 | 11/1992 | Narutaki et al. | 359/67 |

FOREIGN PATENT DOCUMENTS

| | | |
|---|---|---|
| 0113237 | 7/1984 | European Pat. Off. . |
| 0226218 | 6/1987 | European Pat. Off. . |
| 0238174 | 9/1987 | European Pat. Off. . |
| 0326112 | 8/1989 | European Pat. Off. . |
| 0332401 | 9/1989 | European Pat. Off. . |
| 0179325 | 7/1988 | Japan ...................................... 359/67 |
| 0010220 | 1/1991 | Japan ...................................... 359/68 |

OTHER PUBLICATIONS

Patent Abstracts of Japan, vol. 10, No. 149 (P–461) [2206], May 30, 1986, Dainippon Ink Kagaku Kogyo K.K.

Primary Examiner—Huy Mai
Attorney, Agent, or Firm—Adams & Wilks

[57]  ABSTRACT

A color electrooptical device is disclosed wherein an active matrix substrate and a color filter substrate face each other and are disposed spaced apart a predetermined distance. A plurality of color filters are formed on the color filter substrate. A protection film is formed on the color filter substrate and on the color filters. The protection film is capable of adhering to the color filters and to a transparent conductive film. The transparent conductive film is formed on the protection film. A metal film is formed on the transparent conductive film which is effective for decreasing the resistivity of the transparent conductive film. A liquid crystal is sealed between the active matrix substrate and the color filter substrate and a plurality of switching elements are formed on the active matrix substrate. The metal film comprises a light blocking chromium film etched into a grid shape. The color filters are formed by electrodeposition onto a previously formed ITO film formed in a striped pattern on the color filter substrate.

10 Claims, 2 Drawing Sheets

COLOR ELECTROOPTICAL DEVICE

BACKGROUND OF THE INVENTION

The present invention relates to an active matrix type liquid crystal color display unit used for office automation machines and computer terminal units.

As shown in FIG. 4, a prior art active matrix type multi-color display unit comprises a TFT substrate 2 having switching elements 8 and picture element electrodes 9, three primary color (R, G, B) coloring layers 3, light blocking layers 4 disposed in gaps between the coloring layers 3, a coloring layer protecting film 5 laminated on the coloring layers 3 and a color filter substrate 1 laminated thereon and comprised of a transparent electrode 6 which is a display common electrode. Liquid crystal 7, for example, is pinched between those two electrodes.

It has recently been desired to lower the resistance of the common electrode 6 of the active matrix type multi-color display unit to improve its picture quality. However, it is not easy to lower the resistance since the common electrode has to be a transparent electrode. Moreover, the transparent electrode has to be formed on the coloring layer which has no heat resistance, so that conditions for forming the film are restricted, rendering the lowering of the resistance more difficult.

Accordingly, it is an object of the present invention to solve the aforementioned problems and to obtain a high picture quality multi-color display unit by providing a low resistant common electrode.

It is another object of the present invention to provide low cost color electrooptical devices.

SUMMARY OF THE INVENTION

In order to attain the aforementioned goals, according to the present invention, a metal film is formed as a light blocking film on the common electrode of the color filter substrate in the multi-color display unit.

In the multi-color display unit structured as described above, even if a resistance value of the common electrode itself is high, the resistance of the common electrode may be lowered in the end since the metal film is directly formed on it.

Accordingly, the present invention allows to easily realize the lowering of the resistance of the common electrode which has been difficult in the past by forming the metal film on the common electrode as the light blocking film and as a result, to provide a high picture quality multi-color display unit.

Furthermore, since the resistance value of the common electrode itself can be high, the thickness of the ITO (Indium Tin Oxide) film for example may be thinned, so that a transmittivity of the ITO may be improved and the time for forming the ITO may be shortened. The former leads to a further improvement of the picture quality of the multi-color display unit and the latter contributes to the lowering of the cost.

DETAILED DESCRIPTION OF THE INVENTION

The present invention will be described in the following in connection with the preferred embodiments thereof with reference to accompanying drawings.

Figure 1:
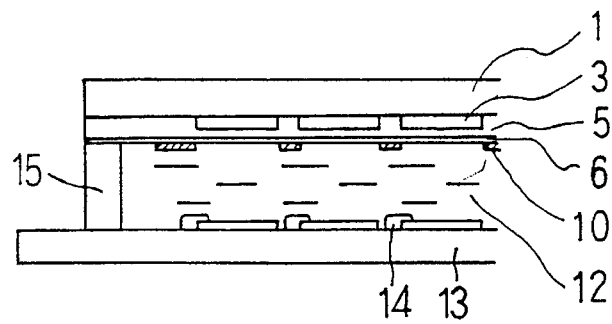
FIG. 1 is a drawing explaining a first embodiment of the present invention.

FIG. 1 shows a first embodiment. A color filter substrate 1 was formed first by forming coloring layers 3 by a dyeing or printing method. A protection film 5 is formed to protect or flatten the coloring layers and is an ITO film 6 is formed by low temperature sputtering.

The color filter substrate 1 is disposed on an active matrix substrate 13 with interposing liquid crystal material 12 and sealing material 15. A pulrality of switching elements 14 are formed on the active matrix substrate 13 to control electrical charges for the liquid crystal layer.

The thickness of the film was 1000 angstrom and the sheet resistance value was 50 ohm. Cr film was formed thereon and was etched into grid shape to form light blocking films 10. The resistance value of ITO could be reduced to 10 ohm as a result of the Cr film. It is desirable to have the protection film 5 to improve the reliability of the unit.

When a multi-color display unit as shown in FIG. 1 was fabricated using this color filter substrate, a high picture quality display unit having no unevenness of contrast across the whole screen could be obtained.

FIGS. 2(a–g) show a second embodiment. The coloring layer is formed by electro-deposition in this embodiment and FIGS. 2(a–g) show production steps of the color filter substrate.

Figure 2A:
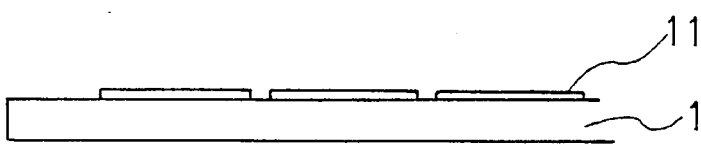
FIGS. 2(a–g) are a drawing explaining a second embodiment of the present invention.

An ITO film 11 is formed on an insulating substrate 1 by sputtering and other methods and is etched into an arbitrary pattern to allow the electro-deposition (FIG. 2a). The pattern that allows the electro-deposition may be for example, a stripe pattern as shown in FIG. 2f.

Figure 2B:
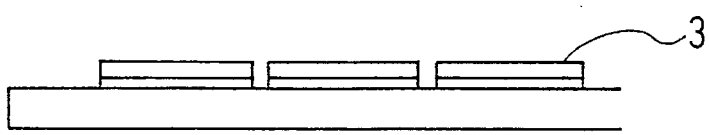

A coloring layer 3 is formed on the ITO film by the electro-deposition (FIG. 2b). If coloring layers for plurality of colors are to be formed at this time, the electro-deposition is repeatedly performed for each color.

Figure 2C:
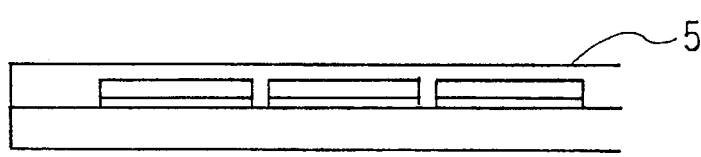
Figure 2D:
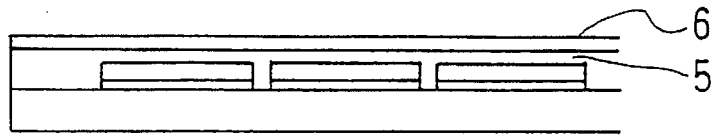

A protection film 5 is formed by spinner and other methods (FIG. 2c). Then an ITO film 6 is formed by sputtering and other methods (FIG. 2d). At this time, since the coloring layer has been already formed on the substrate, the temperature during formation of the film is preferred to be less than 250° C. This ITO film is used as a driving common electrode of the display unit.

Figure 2E:
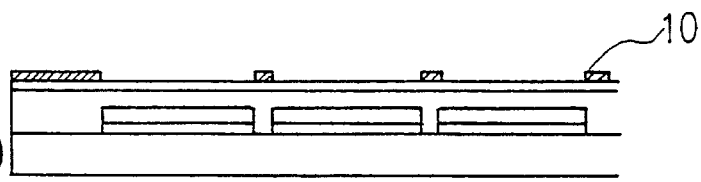
Figure 2F:
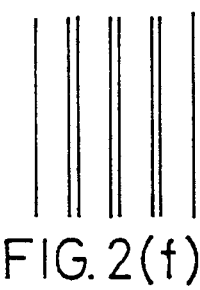
Figure 2G:
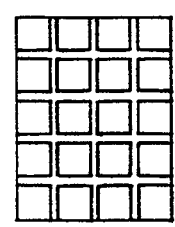

Then a metal film 10 comprising Cr and the like is formed by sputtering and other methods and is etched so that it turns out be a desired light blocking film pattern (FIG. 2e). Any to pattern, such as a grid pattern as shown in FIG. 2g, may be formed.

The color filter substrate having a low resistance transparent electrode similar to that in the first embodiment could be fabricated from the above steps and a high picture quality multi-color display unit could be obtained.

As seen from the present embodiment, the present invention allows the formation of the grid shape light blocking film suitable for active matrix type multi-color display units, so that a low cost multi-color display unit may be provided.

Figure 3:
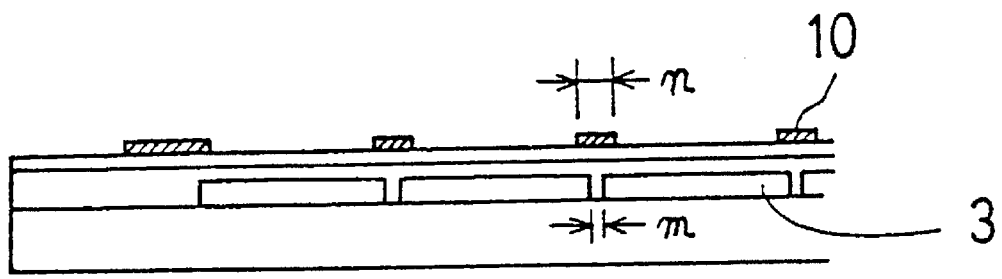
FIG. 3 is a drawing explaining a third embodiment of the present invention.
Figure 4:
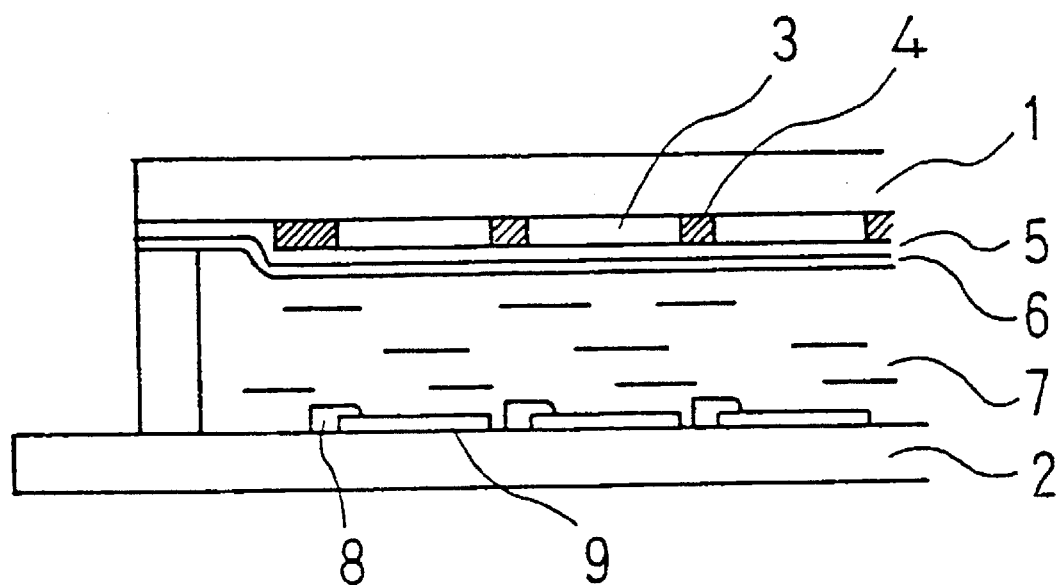
FIG. 4 is a drawing explaining a prior art example.

FIG. 3 shows a third embodiment. A gap m between the coloring layers 3 has a relationship of m<n with a width n of the light blocking film 10. Thereby no dislocation is brought about between the light blocking film 10 and the color filter 3. Accordingly a decrease of picture quality due to the dislocation may be eliminated and at the same time, yields in the production process can be improved.

What is claimed is:

1. A color electro-optical device, comprising: an active matrix substrate; a color filter substrate disposed spaced apart a predetermined distance from and facing the active matrix substrate; a plurality of color filters formed on the color filter substrate; a protection film formed on the color filter substrate and on the color filters, the protection film comprising a material capable of adhering to the color filters and a transparent conductive film; a transparent conductive film formed on the protection film; a metal film formed on the transparent conductive film effective for decreasing the resistivity of the transparent conductive film, the metal film comprising a light blocking film comprised of Cr etched into a grid shape and having a thickness of 1000 angstroms and a sheet resistance value of 50 ohms; a liquid crystal sealed between the active matrix substrate and the color filter substrate; and a plurality of switching elements.

2. A color electro-optical device according to claim 1; wherein the transparent conductive film comprises an ITO film.

3. A color electro-optical device, comprising: an active matrix substrate; a color filter substrate disposed spaced apart a predetermined distance from and facing the active matrix substrate; an ITO film formed on the color filter substrate in a stripe pattern; a plurality of color filters formed on the ITO film by electro-deposition; a protection film formed on the color filter substrate and on the color filters, the protection film comprising a material capable of adhering to the color filters and a transparent conductive film; a transparent conductive film formed on the protection film; a metal film formed on the transparent conductive film effective for decreasing the resistivity of the transparent conductive film; a liquid crystal sealed between the active matrix substrate and the color filter substrate; and a plurality of switching elements.

4. A color electro-optical device according to claim 3; wherein the transparent conductive film is formed at a temperature less than 250° C. to prevent degradation of the already-formed color filters.

5. A color electro-optical device, comprising: an active matrix substrate; a color filter substrate disposed spaced apart a predetermined distance from and facing the active matrix substrate; a plurality of color filters formed on the color filter substrate, the color filters being formed in a spaced apart relation having a gap between respective color filters; a protection film formed on the color filter substrate and on the color filters, the protection film comprising a material capable of adhering to the color filters and a transparent conductive film; a transparent conductive film formed on the protection film; a metal film formed on the transparent conductive film effective for decreasing the resistivity of the transparent conductive film, the metal film being etched to form a pattern having a portion of the metal film facing each respective gap, each portion having a width greater than the width of each respective gap; a liquid crystal sealed between the active matrix substrate and the color filter substrate; and a plurality of switching elements.

6. A method of manufacturing a color electro-optical device, comprising the steps of: providing an active matrix substrate; providing a color filter substrate disposed spaced apart a predetermined distance from and facing the active matrix substrate; forming a plurality of color filters on the color filter substrate by electro-deposition; forming a transparent conductive film over the color filters; forming a metal film having a thickness of 1000 angstroms and a sheet resistance value of 50 ohms on the transparent conductive film, the metal film being formed by etching a light blocking film comprising Cr into a grid shape and being effective for decreasing the resistivity of the transparent conductive film; sealing a liquid crystal between the active matrix substrate and the color filter substrate; and forming a plurality of switching elements on the active matrix substrate.

7. A method of manufacturing a color electro-optical device, comprising the steps of: providing an active matrix substrate; providing a color filter substrate disposed spaced apart a predetermined distance from and facing the active matrix substrate; forming an ITO film on the color filter substrate in a stripe pattern; forming a plurality of color filters on the ITO film by electro-deposition; forming a transparent conductive film over the color filters; forming a metal film on the transparent conductive film effective for decreasing the resistivity of the transparent conductive film; sealing a liquid crystal between the active matrix substrate and the color filter substrate; and forming a plurality of switching elements on the active matrix substrate.

8. A method of manufacturing a color electro-optical device according to claim 7; further comprising the step of forming a protection film on the color filter substrate and on the color filters, the protection film comprising a material capable of adhering to the color filters and the transparent conductive film.

9. A method of manufacturing a color electro-optical device according to claim 8; wherein the transparent conductive film is formed at a temperature less than 250° C. to prevent degradation of the already-formed color filters.

10. A method of manufacturing a color electro-optical device according to claim 9; wherein the color filters are formed in a spaced apart relation having a gap between respective color filters; and wherein the metal film is etched to form a pattern having a portion of the metal film facing each respective gap and having a width greater than the width of each respective gap.

* * * * *